United States Patent
Yang et al.

(10) Patent No.: US 12,474,373 B2
(45) Date of Patent: Nov. 18, 2025

(54) TEST SOCKET INCLUDING PROBES FORMED OF ELASTIC MATERIAL CONTAINING CONDUCTIVE PARTICLES AND METHOD OF MANUFACTURING THE SAME

(71) Applicant: LEENO INDUSTRIAL INC., Busan (KR)

(72) Inventors: Woesuk Yang, Busan (KR); Byeongcheol Lee, Busan (KR)

(73) Assignee: LEENO INDUSTRIAL INC., Busan (KR)

( * ) Notice: Subject to any disclaimer, the term of this patent is extended or adjusted under 35 U.S.C. 154(b) by 210 days.

(21) Appl. No.: 18/271,336

(22) PCT Filed: Dec. 28, 2021

(86) PCT No.: PCT/KR2021/019981
§ 371 (c)(1),
(2) Date: Jul. 7, 2023

(87) PCT Pub. No.: WO2022/149783
PCT Pub. Date: Jul. 14, 2022

(65) Prior Publication Data
US 2024/0069066 A1    Feb. 29, 2024

(30) Foreign Application Priority Data
Jan. 8, 2021    (KR) .......... 10-2021-0002776

(51) Int. Cl.
*G01R 1/04* (2006.01)
*G01R 1/067* (2006.01)
(Continued)

(52) U.S. Cl.
CPC ....... *G01R 1/0466* (2013.01); *G01R 1/06716* (2013.01); *G01R 1/06755* (2013.01); *G01R 3/00* (2013.01); *G01R 31/2863* (2013.01)

(58) Field of Classification Search
CPC .............. G01R 1/0466; G01R 1/06716; G01R 1/06722; G01R 1/06755; G01R 1/07314;
(Continued)

(56) References Cited

U.S. PATENT DOCUMENTS 6,854,985 B1 *  2/2005  Weiss ................ H01R 13/2414
                                                                439/91
8,174,279 B2 *  5/2012  Lee .................... G01R 1/06744
                                                                324/754.16
(Continued)

FOREIGN PATENT DOCUMENTS

JP    9-320667 A    12/1997
JP    2001-237039 A    8/2001
(Continued)

OTHER PUBLICATIONS

Extended European Search Report issued Jun. 3, 2024 in European Application No. 21917944.7.
(Continued)

*Primary Examiner* — Vinh P Nguyen
(74) *Attorney, Agent, or Firm* — Sughrue Mion, PLLC

(57) ABSTRACT

Disclosed is a test socket. The test socket includes a base frame shaped like a plate having a plurality of probe holes and conductive probes accommodated in the plurality of probe holes, having terminal portions protruding from both sides of the base frame, and comprising elastic material having higher elastic deformation than the base frame and conductive particles distributed in the elastic material.

7 Claims, 9 Drawing Sheets

(51) Int. Cl.
*G01R 3/00* (2006.01)
*G01R 31/28* (2006.01)

(58) Field of Classification Search
CPC ... G01R 1/07357; G01R 3/00; G01R 31/2863
See application file for complete search history.

(56) References Cited

U.S. PATENT DOCUMENTS

| | | | |
|---|---|---|---|
| 11,693,027 B2* | 7/2023 | Kim | G01R 1/0441 |
| | | | 324/756.02 |
| 2015/0153387 A1 | 6/2015 | Lee | |
| 2015/0377923 A1* | 12/2015 | Lee | G01R 1/0416 |
| | | | 324/756.02 |
| 2017/0010324 A1 | 1/2017 | Kim et al. | |
| 2021/0302494 A1 | 9/2021 | Oh | |

FOREIGN PATENT DOCUMENTS

| | | | |
|---|---|---|---|
| JP | 2005-222727 A | | 8/2005 |
| JP | 2007-292696 A | | 11/2007 |
| JP | 2011-47917 A | | 3/2011 |
| JP | 2012-16883 A | | 1/2012 |
| KR | 20-2009-0008697 U | | 8/2009 |
| KR | 10-2009-0103115 A | | 10/2009 |
| KR | 10-1110002 B1 | | 1/2012 |
| KR | 10-2012-0020783 A | | 3/2012 |
| KR | 10-1339166 B1 | | 12/2013 |
| KR | 10-1522624 B1 | | 5/2015 |
| KR | 10-1823006 B1 | | 1/2018 |
| KR | 10-2019-0067389 A | | 6/2019 |
| KR | 20190067389 | * | 6/2019 |
| KR | 10-2019-0121493 A | | 10/2019 |
| KR | 10-2020-0115036 A | | 10/2020 |
| KR | 10-2179457 B1 | | 11/2020 |
| TW | 200603486 A | | 1/2006 |
| TW | 201932847 A | | 8/2019 |
| WO | 2018/208117 A1 | | 11/2018 |

OTHER PUBLICATIONS

Office Action issued Jul. 30, 2024 in Japanese Application No. 2023-541553.
Korean Office Action for KR 10-2021-0002776 dated Jul. 12, 2022.
Korean Office Action for KR 10-2021-0002776 dated Nov. 17, 2022.
Korean Office Action for KR 10-2021-0002776 dated Mar. 16, 2023.
Taiwanese Office Action for TW 110145845 dated Jun. 30, 2022.
Taiwanese Notice of Allowance for TW 110145845 dated Jan. 4, 2023.
International Search Report for PCT/KR2021/019981 dated Apr. 26, 2022.
Written Opinion for PCT/KR2021/019981 dated Apr. 26, 2022.
Written Decision on Registration issued Sep. 15, 2023 in Korean Application 10-2021-0002776.

* cited by examiner (a)  (b)

(a)        (b)

TEST SOCKET INCLUDING PROBES FORMED OF ELASTIC MATERIAL CONTAINING CONDUCTIVE PARTICLES AND METHOD OF MANUFACTURING THE SAME

CROSS REFERENCE TO RELATED APPLICATIONS

This application is a National Stage of International Application No. PCT/KR2021/019981 filed Dec. 28, 2021, claiming priority based on Korean Patent Application No. 10-2021-0002776 filed Jan. 8, 2021, the disclosures of which are incorporated by reference.

TECHNICAL FIELD

The disclosure relates to a test socket for testing electrical characteristics of a semiconductor or the like object-to-be-tested, and a method of manufacturing the same.

BACKGROUND ART

After manufacturing a semiconductor, the electric characteristics of the semiconductor are tested by a test socket. The test socket may include a compliant probe for electric connection between a test circuit terminal of a testing device that applies a test signal and a terminal of the semiconductor.

FIG. 1 is a cross-sectional view showing a part of a conventional test socket 1. As shown in FIG. 1, the conventional test socket 1 may include a plurality of conductive portions 12 arranged in an insulating base 11 made of silicone. Both the insulating base 11 and the conductive portions 12 are made of silicone material. The insulating base 11 does not include conductive particles, and only the conductive portions 12 are crowded with conductive particles 13.

FIG. 2 illustrates that the conductive portions 12 of the test socket 1 are pressurized for the test. As shown therein, the pressurization causes the plurality of conductive portions 12 to be deformed so that the conductive particles 13 can be in contact with each other and become conductive, thereby allowing the test signal to be transmitted to the semiconductor.

However, as shown in FIG. 2, when the plurality of conductive portions 12 are deformed, the insulating base 11 is also deformed and therefore the conductive particles 13 in the adjacent conductive portions 12 go near to each other and are short-circuited, thereby lowering the reliability of the test.

DISCLOSURE

Technical Problem

The disclosure is conceived to solve the foregoing problems and aims to provide a test socket, which enhances reliability of a test, and a method of manufacturing the same.

Further, the disclosure aims to provide a test socket, which can be precisely manufactured, and a method of manufacturing the same.

Technical Solution

According to an embodiment of the disclosure, a test socket is provided. The test socket includes a base frame having a plurality of probe holes, and conductive probes accommodated in the plurality of probe holes, having terminal portions protruding from both sides of the base frame, and comprising elastic material having higher elastic deformation than the base frame and conductive particles distributed in the elastic material.

The elastic material may comprise silicone.

In units of the probes, the conductive particles may have a larger volume than the elastic material.

In units of the probes, a volume ratio of the conductive particles to the elastic material may be 3-6:1.

The base frame may comprise a vacuum suction hole, and a sealing member surrounding the vacuum suction hole, and the sealing member is formed in the base frame by injection molding.

According to an embodiment of the disclosure, a method of manufacturing a test socket is provided. The method of manufacturing a test socket includes preparing a base frame, forming a plurality of probe holes in the base frame, preparing an upper mold and a lower mold, which are respectively positioned on a top and a bottom of the base frame and respectively comprise a first terminal groove and a second terminal groove at positions corresponding to an upper end and a lower end of the probe hole, filling an elastic material comprising conductive particles into the probe hole of the base frame, the first terminal groove of the upper mold and the second terminal groove of the lower mold and applying magnetic force between the first terminal groove and the second terminal groove.

The elastic material may have higher elastic deformation than the base frame.

The first terminal groove and the second terminal groove may be engraved to have a shape corresponding to a crown pattern or a cone pattern.

Advantageous Effects

In the test socket of the present invention, since the base frame that insulates between probes is made of, for example, insulating plastic, a short circuit between the probes can be prevented even with the pressure applied during testing.

DESCRIPTION OF DRAWINGS

The above and/or other aspects will become apparent and more readily appreciated from the following description of embodiments, taken in conjunction with the accompanying drawings, in which.

BEST MODE

Figure 1:
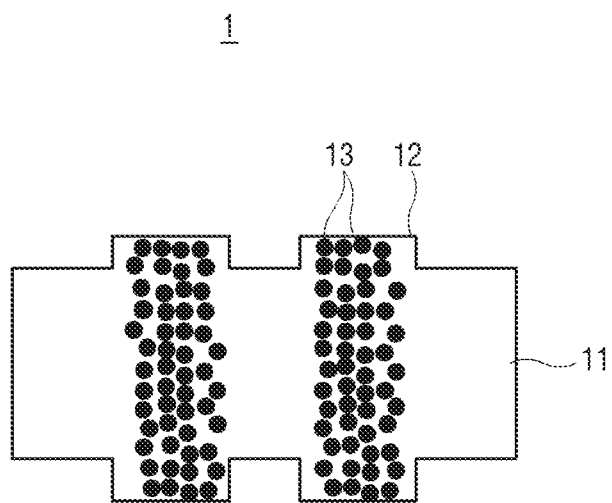
FIG. 1 shows a partial cross-section of a conventional test socket.
Figure 2:
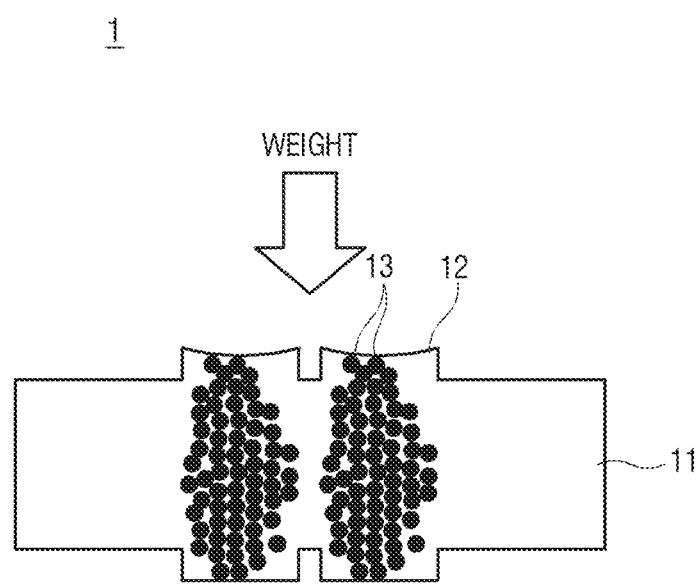
FIG. 2 shows an operating state of the test socket of FIG. 1 during a test.

Below, various embodiments of the disclosure will be described with reference to the accompanying drawings.

However, it is not intended to limit the disclosure to specific embodiments, and it will be understood that the description includes various modifications, equivalents, and/or alternatives to the embodiments of the disclosure. In terms of the drawings, like reference numerals may be used for like elements. In the drawings, like numerals or symbols refer to like elements having substantially the same function, and the size of each element may be exaggerated for clarity and convenience of description. In the following descriptions, details about publicly known functions or features will be omitted if it is identified that they cloud the gist of the present inventive concept.

In the disclosure, terms "have," "may have," "include," "may include," etc. indicate the presence of corresponding features (e.g., a numeral value, a function, an operation, or an element such as a part, etc.), and do not exclude the presence of additional features.

In the disclosure, terms "A or B", "at least one of A or/and B", "one or more of A or/and B" or the like may include all possible combinations of elements enumerated together. For example, "A or B", "at least one of A and B", or "at least one of A or B" may refer to all of the cases of (1) including at least one A, (2) including at least one B, or (3) including all of at least one A and at least one B.

In the disclosure, terms "first", "second", etc. are used only to distinguish one element from another, and singular forms are intended to include plural forms unless otherwise mentioned contextually.

In addition, in the disclosure, terms "upper", "lower", "left", "right", "inside", "outside", "inner", "outer", "front", "rear", etc. are defined with respect to the accompanying drawings, and do not restrict the shape or location of the elements.

Further, in the disclosure, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance.

Figure 3:
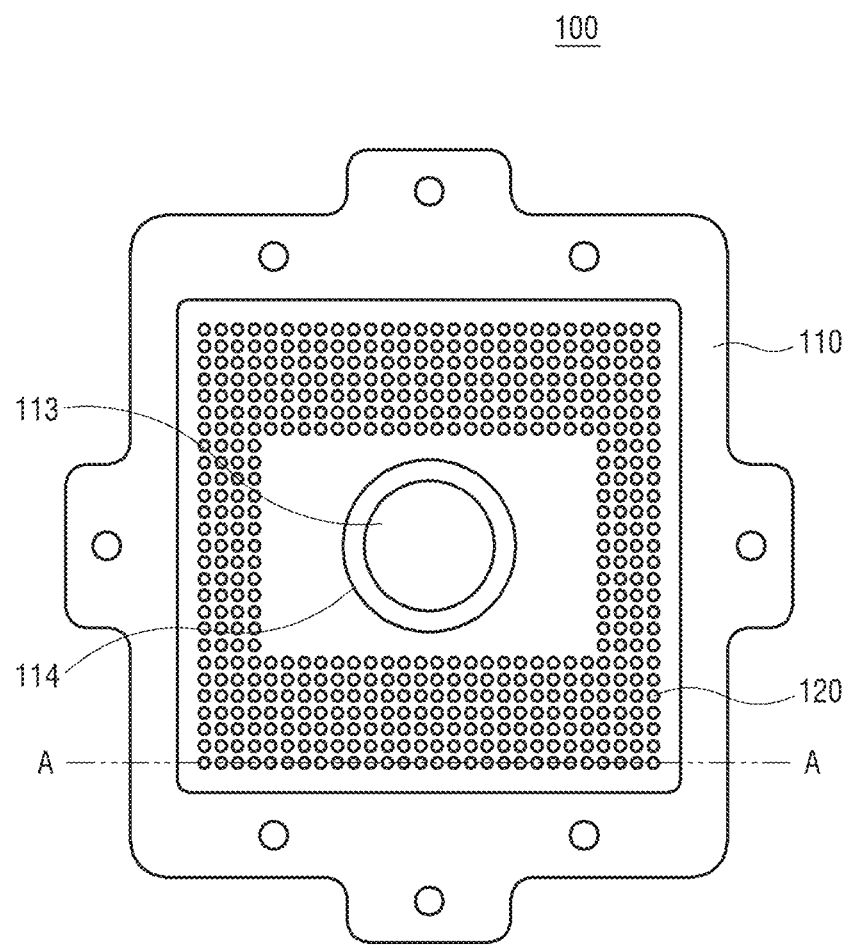
FIG. 3 shows a test socket according to the disclosure.
Figure 4:
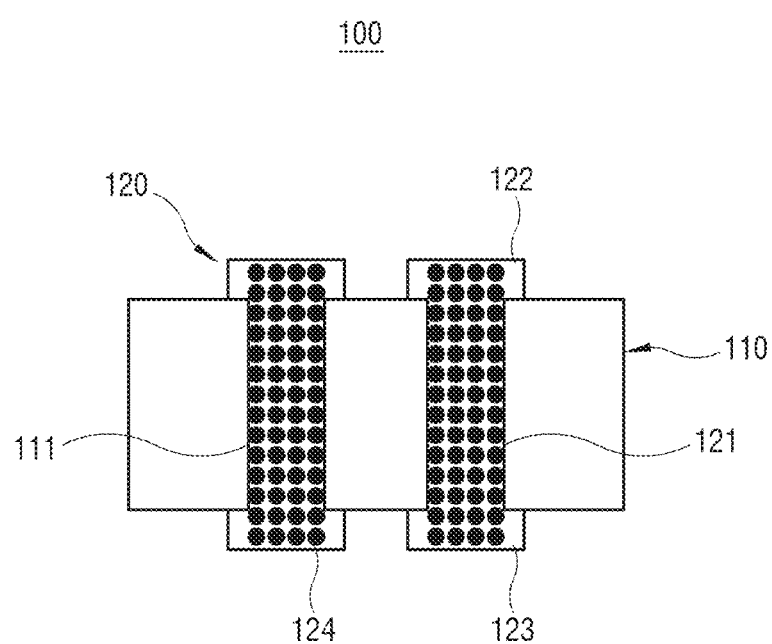
FIG. 4 shows a partial cross-section taken along line A-A of FIG. 3.
Figure 5:
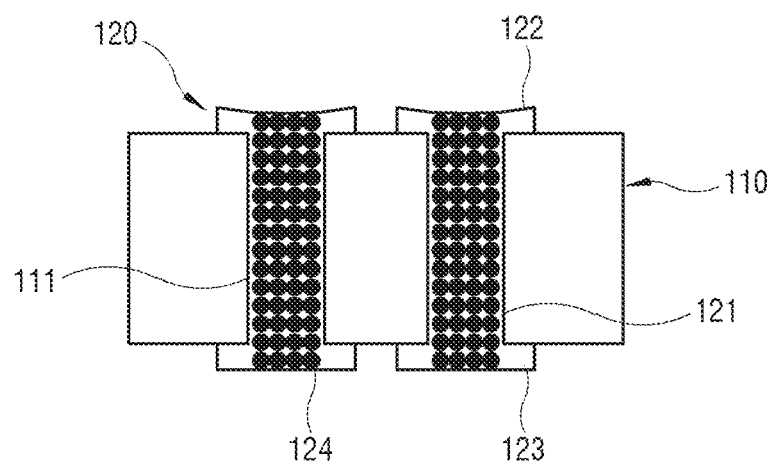
FIG. 5 shows a state of FIG. 4 during a test.

FIG. 3 shows a test socket 100 according to the disclosure, FIG. 4 shows a partial cross-section taken along line A-A of FIG. 3, and FIG. 5 shows a state of FIG. 4 during a test.

Referring to FIGS. 3 and 4, the test socket 100 may include a base frame 110 formed with probe holes 111, and conductive probes 120 filled in the probe holes 111.

*35 The base frame 110 may include the probe holes 111 provided corresponding to terminals of a semiconductor or the like object-to-be-tested and terminals of a test circuit, a circular vacuum suction hole 113 provided at the center thereof, and a sealing member 114 provided around the vacuum suction hole 113.

The base frame 110 is shaped like a plate, and made of, for example, hard insulation plastic, ceramic or the like insulating material.

The vacuum suction hole 113 refers to a passage to suck the object-to-be-tested put on the test socket 100 for a test.

The sealing member 114 allows the object-to-be-tested to be intensively sucked without leakage when the object-to-be-tested is sucked through the vacuum suction hole 113, thereby increasing suction power for the object-to-be-tested. The sealing member 114 may be provided as, for example a rubber or silicone ring. The sealing member 114 may be stably fixed to the base frame 110 by insert injection molding.

In the conventional test socket, both the base frame and the probe are made of the same silicone material, and therefore the sealing member cannot be injection-molded but has no choice to be attached with an adhesive. Therefore, the conventional test socket has a problem that the adhesive melts and contaminates the object-to-be-tested during the test or the sealing member separates away from the conventional test socket.

A probe 120 may, as shown in FIG. 4, include a post 121 filled in the probe hole 111, a first terminal portion 122 protruding outward from one side of the probe hole 111, and a second terminal portion 123 protruding outward from the other side of the probe hole 111.

Figure 7:
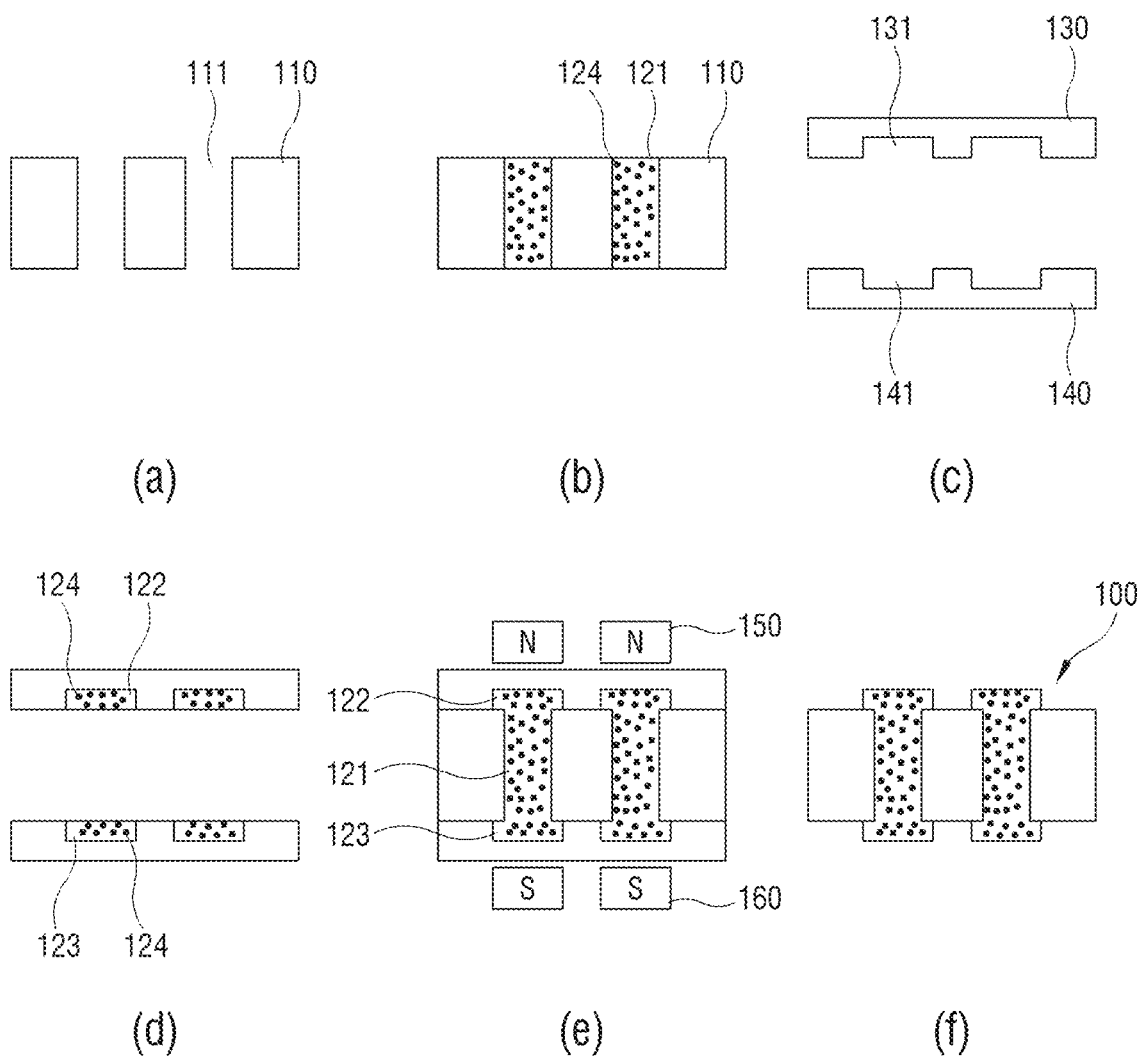
FIG. 7 illustrates a process of manufacturing the test socket of FIG. 3.

The probe 120 may be formed by injecting an elastic material, in which conductive particles 124 are distributed, into the probe hole 111 of the base frame 110, a first terminal groove 131 of an upper mold 130 and a second terminal groove 141 of a lower mold 140 as shown in FIG. 7.

The post 121 may be formed in the probe hole 111.

The first terminal portion 122 may be formed in the first terminal groove 131 of the upper mold 130 of FIG. 7.

The second terminal portion 123 may be formed in the second terminal groove 141 of the lower mold 140 of FIG. 7.

The elastic material for the probe 120 may for example include silicone, rubber, etc., which has higher elastic deformation than that for the base frame 110.

The conductive particles 124 may for example be manufactured by plating nickel or the like magnetic material with gold (Au) or the like highly conductive metal.

Referring to FIG. 5, when the object-to-be-tested is pressurized for the test in the state that the first terminal portion 122 of the probe 120 is in contact with the terminal of the object-to-be-tested (not shown) and the second terminal portion 123 is in contact with the terminal of the test circuit (not shown), the first terminal portion 122 and the second terminal portion 123 may be compressively deformed. In this case, the conductive particles 124 distributed in the elastic material of the probe 120 are in contact with each other and become conductive. In result, the terminal of the object-to-be-tested, the probe 120, and the terminal of the test circuit are electrically connected to one another to thereby allow a test signal to be transmitted.

In the test socket 100 according to an embodiment of the disclosure, the probes 120 are independently compressed without deforming the base frame 110 due to a load during the test, and therefore the compressed probe 120 and its adjacent probes 120 are little likely to be short-circuited. Because the base frame 110 is not deformed, the elastic deformation may be lower than that of the conventional one.

Accordingly, to make the probes 120, which are independently deformed, become conductive even by small pressurization and to meet the durability required for the test socket, the volume of the conductive particles 124 may be larger than the volume of the elastic material with respect to one probe 120. Preferably, a volume ratio of the conductive particles to the elastic material may be 3-6:1 for one probe 120.

When the amount of elastic material is too small, the probe 120 has low elasticity during the test and is thus decreased in durability. On the other hand, when the amount of elastic material is too much, the probe 120 is improved in elasticity but excessively increased in resistance during the test, thereby lowering the reliability of the test.

As described above, the volume ratio between the elastic material the conductive particles, which controls the resistance variation and the durability during the test, may be replaced by a weight ratio considering specific gravity. This can be easily calculated by converting the specific gravity and the volume ratio between the elastic material and the conductive particles. For example, when the volume ratio of the elastic material to the conductive particles is 1:5 and the specific gravity ratio of the elastic material (silicone) to the conductive particles (nickel plated with gold) is 1:9, a weight ratio of the elastic material and the conductive particles may be 1:45. Here, in this weight ratio, voids between the conductive particles 124 are ignored. Accordingly, the weight of the conductive particles may be smaller than 45 when the voids are reflected.

Below, a method of manufacturing the test socket 100 according to an embodiment of the disclosure will be described with reference to FIGS. 6 and 7.

Figure 6:
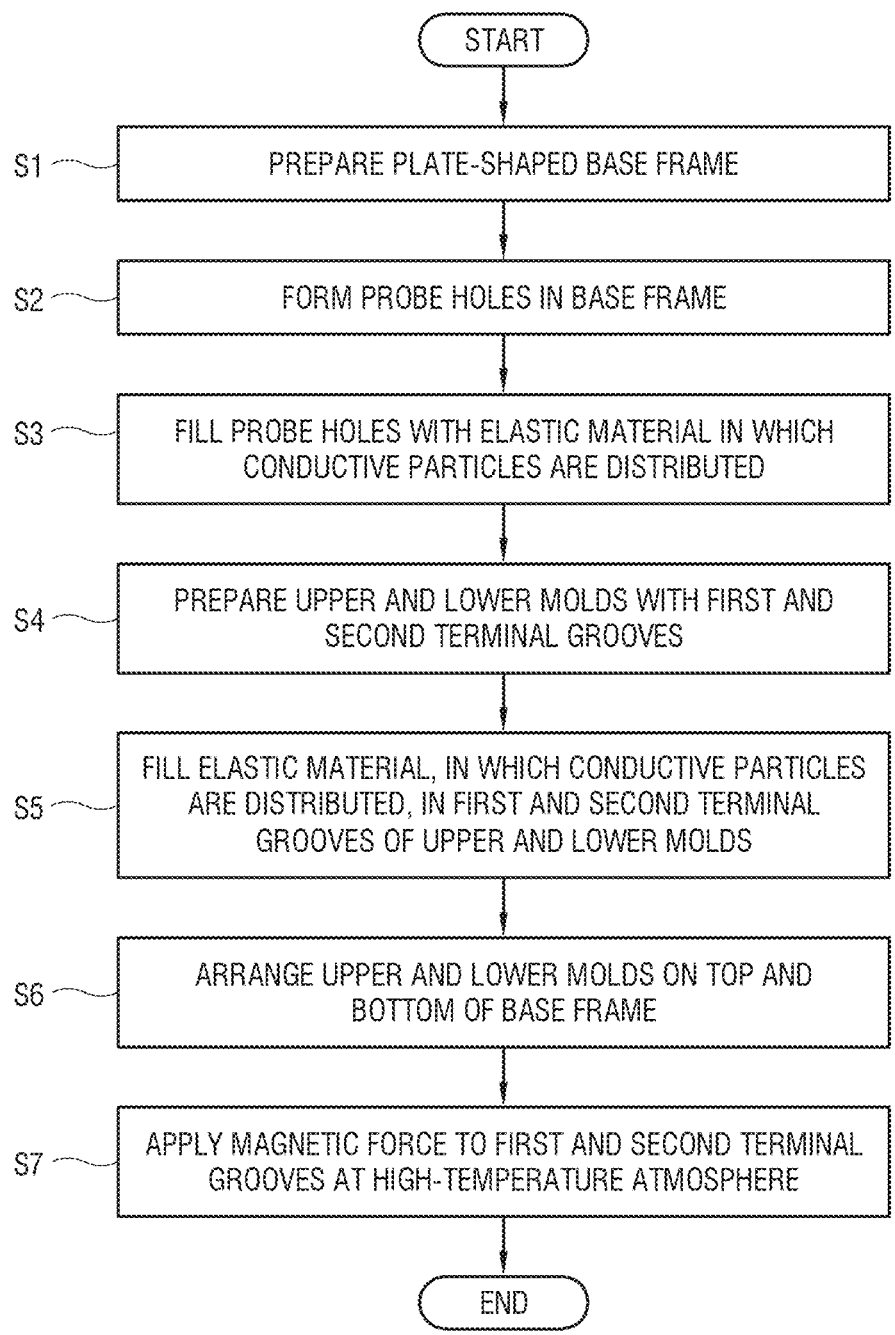
FIG. 6 is a flowchart showing a method of manufacturing the test socket according to an embodiment of the disclosure.

FIG. 6 is a flowchart showing a method of manufacturing the test socket according to an embodiment of the disclosure, and FIG. 7 illustrates a process of manufacturing the test socket of FIG. 3;

At operation S1, the base frame 110 shaped like a plate is prepared. The base frame 110 may be made of plastic or ceramic.

At operation S2, as shown in (a) of FIG. 7, the base frame 110 shaped like a plate may be formed with the probe holes 111 by molding or drilling. Besides the probe holes 111, the vacuum suction hole 113 is also formed at the center of the base frame 110, and the sealing member 114 made of rubber or silicone may be formed by insert injection molding to surround the vacuum suction hole 113.

At operation S3, as shown in (b) of FIG. 7, the elastic material, in which the conductive particles 124 made of nickel plated with gold are distributed, is put into the probe hole 111 of the base frame 110, thereby forming the post 121 of the probe 120.

At operation S4, as shown in (c) of FIG. 7, the upper mold 130 and the lower mold 140 respectively having the first terminal groove 131 and the second terminal groove 141 are prepared.

At operation S5, as shown in (d) of FIG. 7, the elastic material, in which the conductive particles 124 made of nickel plated with gold are distributed, is put into the first terminal groove 131 and the second terminal groove 141, thereby forming the first and second terminal portions 122 and 123.

At operation S6, as shown in (e) of FIG. 7, the upper mold 130 and the lower mold 140 are respectively arranged on the top and bottom of the base frame 110 so that the first and second terminal portions 122 and 123 can be positioned on the upper and lower ends of the post 121.

At operation S7, as shown in (e) of FIG. 7, the N pole of a magnet 150 and the S pole of a magnet 160 are respectively arranged at the positions corresponding to the first and second terminal portions 122 and 123, and the first and second terminal portions 122 and 123 are respectively adhered to the upper and lower ends of the post 121 in a high-temperature atmosphere. The N pole of the magnet 150 and the S pole of the magnet 160 may be a permanent magnet or an electromagnet. The N pole of the magnet 150 and the S pole of the magnet 160 may be given not corresponding to each individual probe 120 but as single bodies throughout the top and bottom of the base frame 110.

The N pole of the magnet 150 and the S pole of the magnet 160 may apply a magnetic field to the conductive particles 124 made of a magnetic material distributed in the elastic material. The conductive particles 124 may get aligned along the magnetic lines of force formed between the N pole of the magnet 150 and the S pole of the magnet 160.

Finally, as shown in (f) of FIG. 7, the test socket 100 is manufactured.

Figure 8:
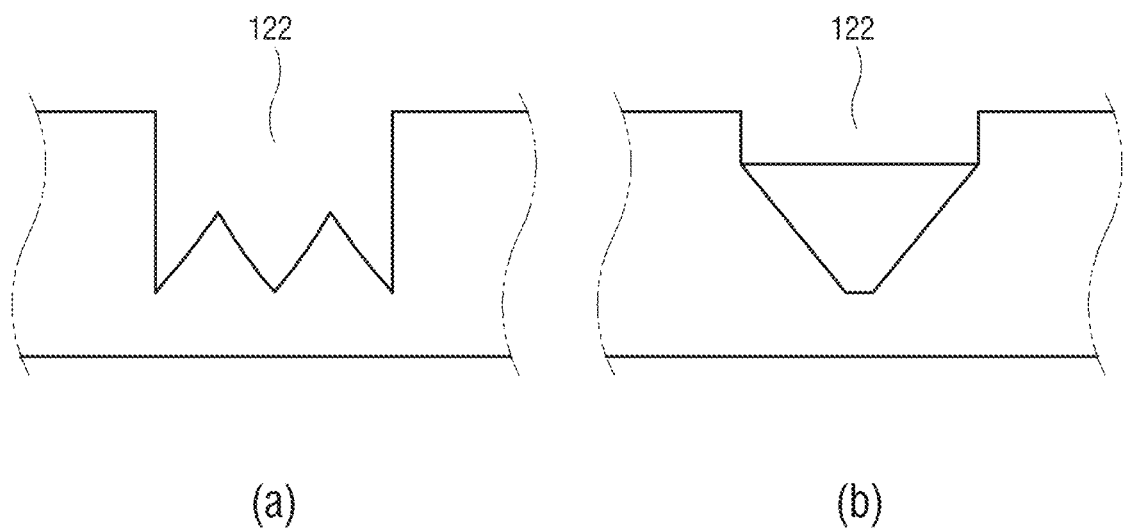
FIG. 8 shows shapes a first terminal groove or a second terminal groove by way of example.

FIG. 8 shows shapes of a first terminal groove or a second terminal groove by way of example.

Referring to (a) of FIG. 8, the first terminal portion 122 to be in contact with the terminal of the object-to-be-tested may be shaped like a crown. The first terminal portion 122 having such a crown shape may be easily manufactured by engraving the first terminal groove 131 into a crown pattern in the upper mold 130 of FIG. 7.

Referring to (b) of FIG. 8, the first terminal portion 122 to be in contact with the object-to-be-tested may be shaped like a cone. The first terminal portion 122 having such a conical shape may be easily manufactured by engraving the first terminal groove 131 into a conical pattern in the upper mold 130 of FIG. 7.

Likewise, the second terminal portion 123 may be manufactured to have various shapes corresponding to the engraved patterns of the second terminal groove 141 in the lower mold 140 of FIG. 7.

Figure 9:
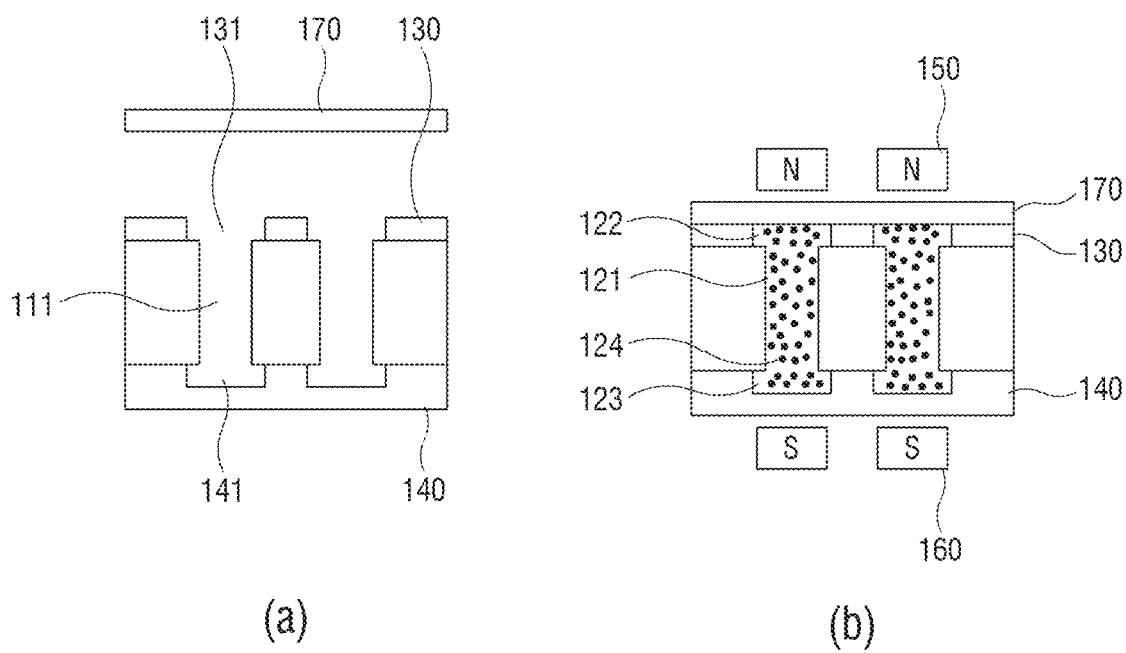
FIG. 9 illustrates a process of manufacturing a test socket according to another embodiment of the disclosure.

FIG. 9 illustrates a process of manufacturing a test socket according to another embodiment of the disclosure.

Referring to (a) of FIG. 9, the probe hole 111 is formed in the base frame 110, the first terminal groove 131 and the second terminal groove 141 are respectively formed in the upper mold 130 and the lower mold 140, and the upper mold 130 and the lower mold 140 are arranged on the top and bottom of the base frame 110 so that the first terminal groove 131, the probe hole 111 and the second terminal groove 141 can be aligned with one another.

Referring to (b) of FIG. 9, a liquid elastic material, in which the conductive particles 124 made of nickel plated with gold are distributed, is put into the probe hole 111 through the first terminal groove 131, and then the first terminal groove 131 is covered with a molding cover 170. The N pole of the magnet 150 and the S pole of the magnet 160 are respectively arranged at the positions corresponding to the first and second terminal portions 122 and 123, and then the liquid elastic material is cured in, for example a high-temperature atmosphere.

In result, as shown in (f) of FIG. 7, the test socket 100 is manufactured.

In the test socket according to the disclosure, the base frame, in which the probes to be elastically deformed are insulated from each other, is made of, for example, insulating plastic, thereby preventing the probes from being short-circuited even when pressurized during the test.

Although exemplary embodiments of the disclosure have been shown and described, the disclosure is not limited to the foregoing specific embodiments, various alternative modifications can be embodied by a person having an ordinary skill in the art without departing from the scope of the disclosure as claimed in the appended claims, and such modified embodiments should not be understood separately from the technical sprit or prospect of the disclosure.

The invention claimed is:
1. A test socket comprising:
a base frame comprising a plurality of probe holes; and
a plurality of probes, each of the plurality of probes respectively provided in one of the plurality of probe holes,
wherein each of the plurality of probes comprises a first terminal portion protruding from a first side of the base frame and a second terminal portion protruding from a second side of the base frame, wherein the each of the plurality of probes are formed of an elastic material having higher elastic deformation than the base frame, wherein conductive particles are provided in the elastic material, and wherein, in each of the plurality of probes, a volume ratio of the conductive particles to the elastic material is 3~6:1.

2. The test socket according to claim 1, wherein the elastic material comprises silicone.

3. The test socket according to claim 1, wherein, in each of the plurality of probes, the conductive particles have a larger volume than the elastic material.

4. The test socket according to claim 1, wherein the base frame further comprises a vacuum suction hole, and a sealing member configured to attach a test object to the test socket, wherein the sealing member surrounding the vacuum suction hole, and wherein the sealing member is formed in the base frame by injection molding.

5. A method of manufacturing a test socket, comprising:

preparing a base frame;

forming a plurality of probe holes in the base frame;

preparing an upper mold and a lower mold, which are respectively positioned on a top and a bottom of the base frame and respectively comprise a first terminal groove and a second terminal groove at positions corresponding to an upper end and a lower end of one of the plurality of probe holes;

forming a plurality of probes by filling an elastic material comprising conductive particles into each of the probe holes of the base frame, the first terminal groove of the upper mold and the second terminal groove of the lower mold; and applying magnetic force between the first terminal groove and the second terminal groove.

6. The method according to claim 5, wherein the elastic material has higher elastic deformation than the base frame.

7. The method according to claim 5, wherein the first terminal groove and the second terminal groove are engraved to have a shape corresponding to a crown pattern or a cone pattern.

* * * * *